Aug. 27, 1940.   E. G. HEINZELMAN   2,213,003
SELF-ENERGIZING HYDRAULIC INTERNAL EXPANSION BRAKE
Filed July 13, 1938   4 Sheets-Sheet 1
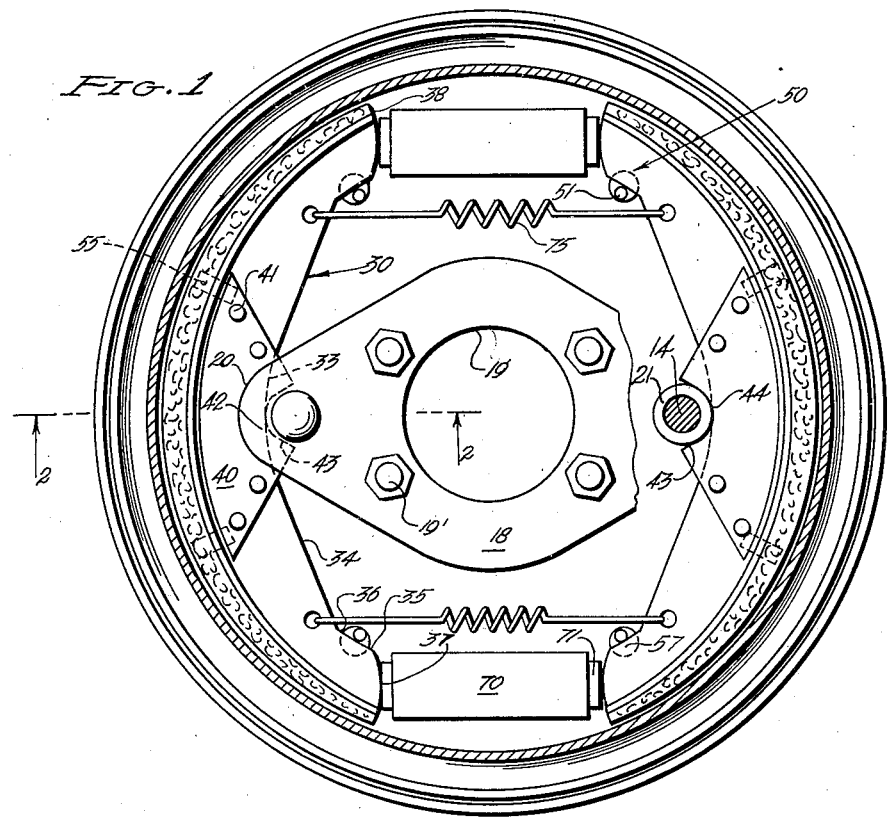
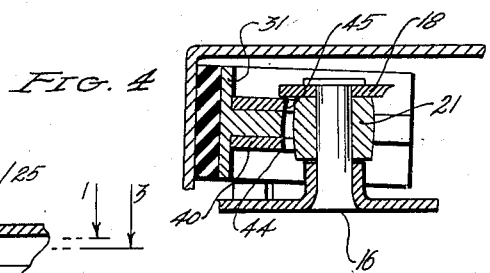
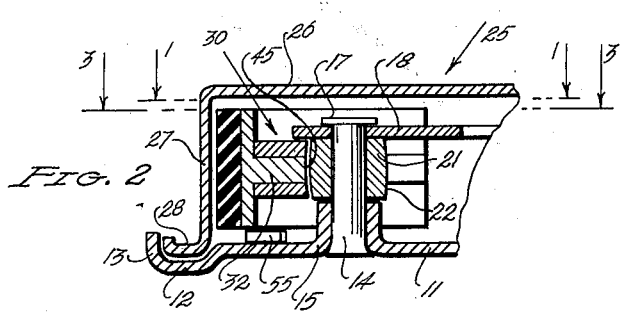
Inventor
EDMUND G. HEINZELMAN
By Hazard and Miller
Attorneys

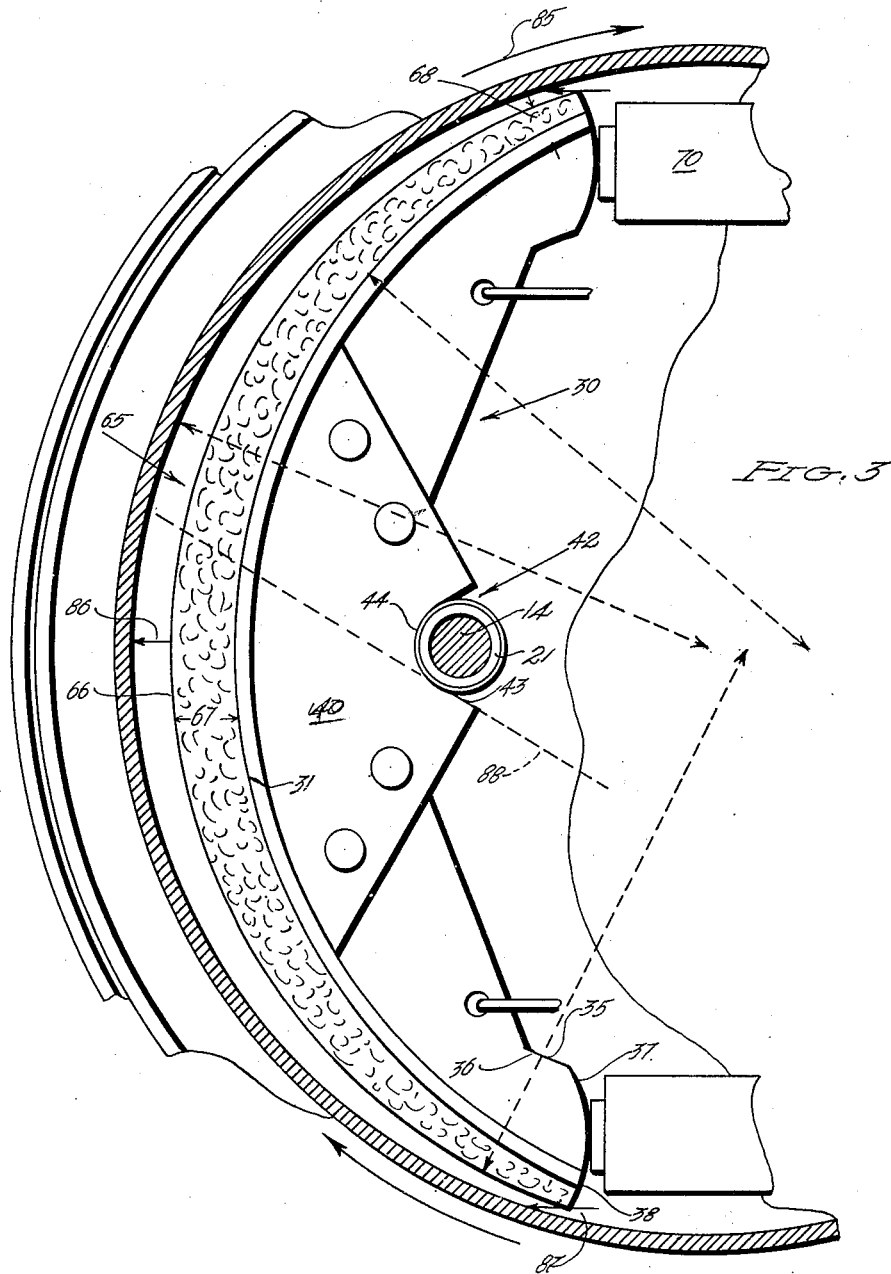

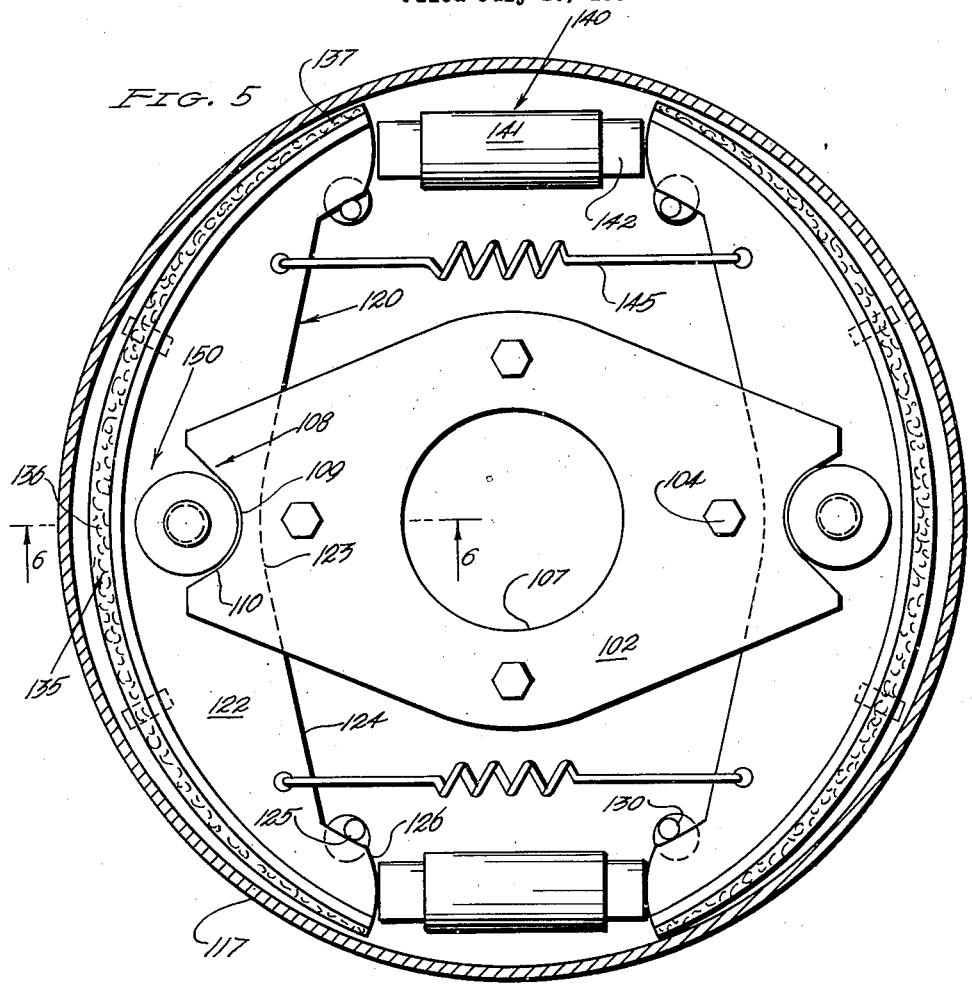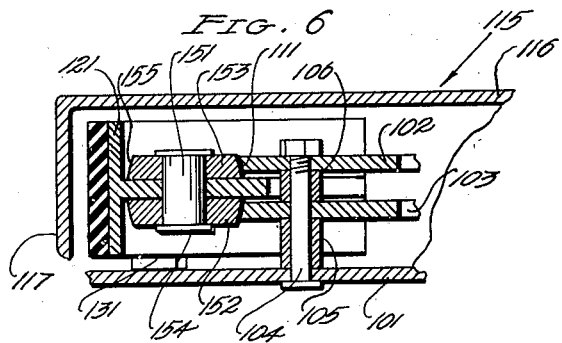

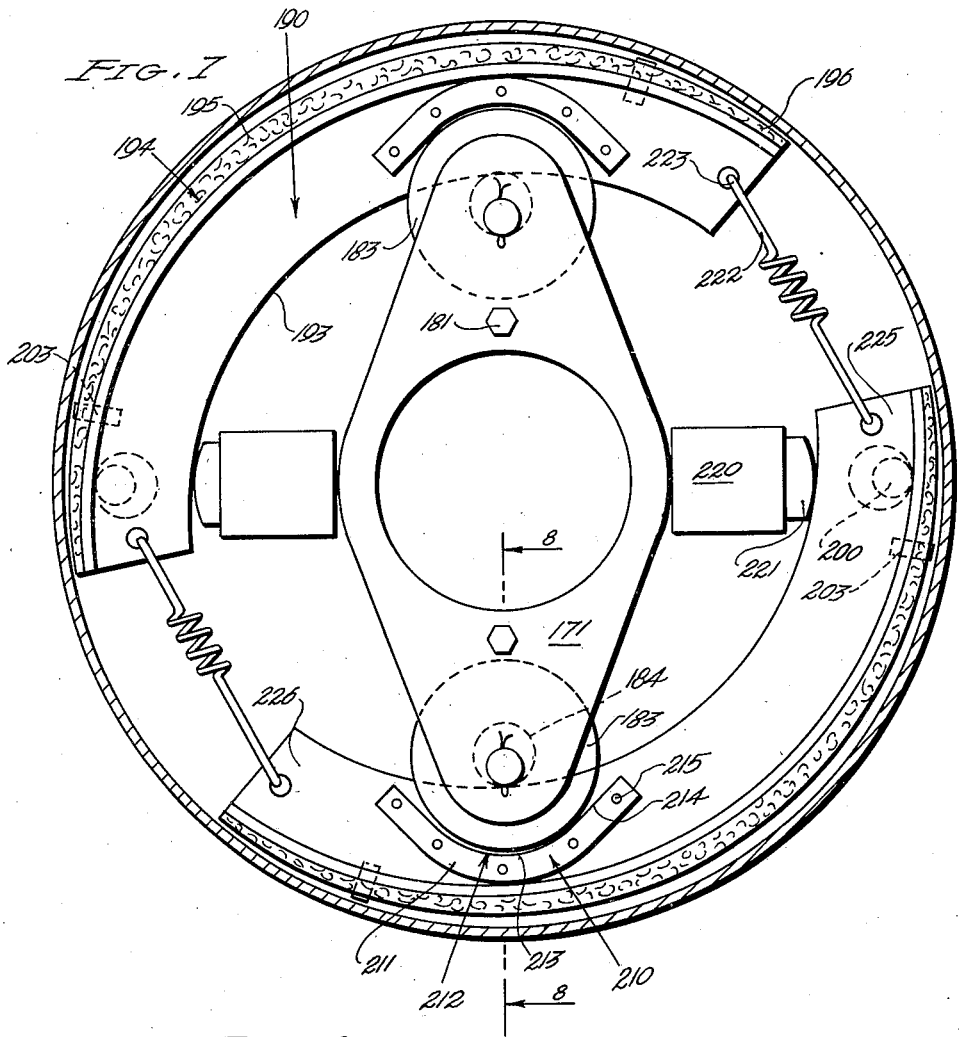
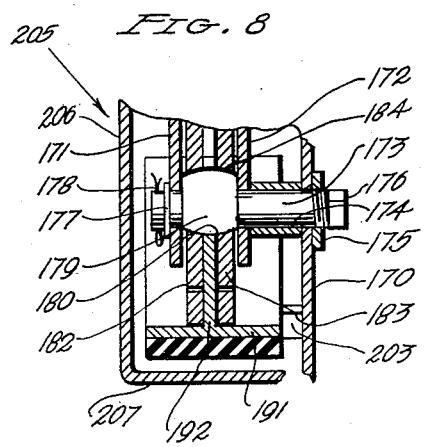

Patented Aug. 27, 1940

2,213,003

UNITED STATES PATENT OFFICE 2,213,003

SELF-ENERGIZING HYDRAULIC INTERNAL EXPANSION BRAKE

Edmund G. Heinzelman, Pasadena, Calif.

Application July 13, 1938, Serial No. 219,009

7 Claims. (Cl. 188—78)

My invention relates to improvements in the type of brakes designated as self energizing, particularly as applied to vehicles in that when the vehicle is progressing and brakes applied the rotation of the wheels tends to increase the brake pressure on the brake drum. In this type of brake particularly in the internal expanding action an unequal pressure is developed by the opposite brake shoes acting on the same drum. It is common practice to have two brake shoes to engage the drum substantially on opposite sides of the drum, however it has been found in many cases that the brake either on the front or on the rear of the axle exerts a greater pressure and hence one shoe acting under more pressure than the other has an unequal wear and braking effort. This is due in many cases of the prior art to the manner in which the brake shoes are mounted for movement. Other disadvantages of certain types of self energizing brakes is that they do not adequately hold or grip the brake drum during a backing operation of the vehicle and thus do not adequately prevent a vehicle from rolling backwards down a hill in which it is driving upgrade. Also other objections to many types of brake construction are that they take no cognizance of the expanding action of the brake drum due to the frictional heat in applying brakes which causes the drum to expand outwardly at its free edge forming a so-called bell. When a brake drum is so expanded it gives an unequal application of the ordinary shoes to the face of the drum.

An oject an feature of my invention is to overcome the above enumerated and other objections of known brake equipment for vehicles. A main object and feature of my invention is a construction by which when the brake shoes are expanded outwardly to have the entire lining contact and press evenly against the inside surface of the drum, the frictional contact of a rotating wheel tends to cause a sliding movement of the shoe in the direction of rotation of the wheel. The force developed reacts against a stationary element such as a stud or a post, the component forces producing an outward wedging action of each brake shoe and lining as a whole and thus materially increases the pressure on the drum over that required merely to contact the lining with the drum in the initial operation. Moreover due to this free sliding or wedging movement, each brake shoe has a slight resultant travel on the axis of the line represented by a wedging surface engaging the fixed abutment stud or the like. This surface is slightly inclined in the direction of rotation of the drum. Manifestly therefore by my invention by providing the brake shoes with complemetary wedging surfaces facing in opposite directions the shoes will have the same self-energizing action on forward or reverse movements of the vehicle but of course the higher the speed of the rotating wheel the greater will be the force supplied to the brake drum.

Considered in more detail, an object and feature of my invention is the construction and combinational action of a brake equipment made up of preferably a pair of brake shoes of similar shape and design, each shoe being provided with a lining of a suitable type. These shoes may be considered as unattached to a fixed structure of the vehicle in that while loosely retained in place by retaining devices they are not pivoted or mounted in equivalent connections to the fixed plates or the like of the wheel and the brake assembly. Each shoe is provided with complementary wedging surfaces converging towards an angle, the apex pointing towards the lining and these wedging surfaces when the shoes are retracted loosely contact a ring-like bushing on an abutment stud. Instead of having the wedge surfaces continue to an angle, they are preferably rounded somewhat concentric with the surface of the wearing ring or bushing. Therefore presuming two opposite shoes are used, when these are pressed outwardly by any suitable manner known to the art and the wheel is rotating with the brake drum, the first action contacts the lining with the inside of the drum. Immediately a frictional grip is developed between the lining and the drum tending to carry each shoe as a unit in the direction of rotation of the drum. This is resisted by the contact of one of the wedge surfaces of each shoe with the bushing and stud, hence the shoe as a unit is forced outwardly approximately in the direction of travel of the inclination of the wedging surface. This however causes an even pressure on unit area to be developed between the brake lining and the drum from end to end of the lining.

My invention includes various ways and constructions of providing the self-energizing brake action due to the wedging motion between the brake shoe and a stationary element. This may involve a construction with an anchor stud or the like mounted in a stationary position on a stationary or backing plate of the brake assembly and having the wedge surfaces on the shoe engaging the anchor stud. In another construction the stationary structure includes the angular wedging surfaces and the reaction element such as rollers are mounted on the brake shoe.

My invention also comprehends a construction wherein the wedging reaction may be symmetrical as to the ends of the shoes or may be adjacent one end of the brake shoes and further where it is desirable to transmit the contact forces close to the lining of the shoe the contact elements may be placed or located in as close proximity as possible to such lining.

Another characteristic of my invention is that I employ a brake lining which may be considered as crescent shaped as mounted on the brake shoe. This is due to the outside or original lining being on the same radius as the inside of the brake drum and further the curvature of the shoe also being on the same radius. This develops a brake lining thicker at the center than at the two ends, as with my construction of brakes, the shoe is forced outwardly to bring the lining into a pressure grip with the cylinder of the drum, therefore there is a contact from end to end of the lining with the drum and as the lining wears down it always maintains a greater thickness at the center than at the ends until the lining is too thin for further use.

Another object and feature of my invention is a somewhat loose mounting of the brake shoes to allow these to tilt when the brake drum expands from heat as it is well known that the brake drums on such expansion become somewhat conical. This is termed developing a bell shape. Such action is due to the outer or free end of the drum becoming heated to a greater degree than that adjacent the disk which conducts the heat and thus expanding outwardly. On account of the somewhat loose connection of the brake shoes and the stationary reaction element and contact lugs or blocks, the shoes may tilt so that the lining forms a more or less close contact with this cone shape of the drum. However manifestly as the brake lining is part of a cylinder, there cannot be a true contact with a part of a cone even although the cone shape of the brake drum is comparatively small.

Another object and feature of my invention is the provision to have an even application of the brake lining to the drum when the drum heats and expands and forms what is termed a bell. This expansion causes the free edge of the drum to expand outwardly and thus the drum does not form a true cylinder but has a slight bell or slope outwardly.

My invention is illustrated in connection with the accompanying drawings, in which:

Fig. 1 may be considered as a complete elevation partly broken away of the inside of a brake and brake drum assembly, this being taken substantially on the line 1—1 of Fig. 2 in the direction of the arrows.

Fig. 2 is a radial horizontal section on the line 2—2 of Fig. 1 in the direction of the arrows.

Fig. 3 is a partially vertical section substantially on the line 3—3 of Fig. 2 in the direction of the arrows on an enlarged scale.

Fig. 4 is a section similar to Fig. 2 illustrating in an exaggerated manner the brake drum expanded by heat and the rocking action of the shoes to conform therewith.

Fig. 5 is an elevation of a modification in which the fixed plates have the wedging edges reacting against studs or the like on the brake shoes.

Fig. 6 is a section on the line 6—6 of Fig. 5 in the direction of the arrows.

Fig. 7 is an elevation of a further modification in which the wedging rollers are mounted on fixed plates and overlap the web of the shoe and engage wedge tracks mounted on the shoe. Further, in this form the wedging reaction is applied non-symmetrical as to the brake shoe.

Fig. 8 is a section on the line 8—8 of Fig. 7 in the direction of the arrows.

In the drawings a stationary or back plate 11 may be of any suitable type and is mounted to be held in a stationary manner from rotation to which the brake assembly is connected. This plate is therefore in the form of a disk and is provided with a slight inwardly bent peripheral section 12 terminating in an out-turned rim 13. Secured to this plate there are two substantial studs 14, the plate being illustrated as having a pressed collar 15 forming a perforation for the stud, the stud being riveted in place as shown at 16 and having a head 17. This head is flanged over an inner stiffening plate 18, this having a suitable opening 19 for the wheel axle assembly and is firmly connected to the plate 11 by bolts 19' or the like. It will be noted that this plate has a projecting end 20 extending beyond the stud. Rotatably mounted on the stud I employ a wheel bushing or collar 21, this being cylindrical on its inside surface and having a barrel shaped or convex peripheral surface 22 considered in any longitudinal and diametrical section. The purpose of this barrel shaped periphery is to permit a slight rocking of the brake shoe assembly as hereinunder described.

The brake drum designated by the assembly numeral 25 has a disk 26, a cylindrical drum surface 27 and an outwardly extending stiffening flange 28. This drum assembly may be made up in the usual manner mounted on a wheel.

The brake shoe assembly 30 employs a curved shoe face member 31 of the same radius as the inside of the drum. This has an inwardly extending web 32, the web having the central concave curved portion 33, straight edge sections 34 continuing to edge surfaces 35 concentric with the brake drum connecting with the edge 34 by an angle 36 and terminating in a convex end 37, merging with the end 38 of the cylindrical shoe faced member. A pair of similar wear plates 40 are mounted on opposite sides of the web 32 and secured thereto by rivets 41. Each of these wear plates has a similar notch indicated at 42. This notch has two opposite converging wedge surfaces 43 and an outer convex surface 44 joining these. These surfaces have a complementary concave face 45 shaped to conform to the peripheral surface 22 of the rotatable sleeve or bushing 21 to permit rocking of the brake shoes when the brake drum expands by heat forming the drum portion 27 slightly in the form of a bell.

The brake shoes may be held as to the limit on their retraction by a conventional type of cam adjuster 50. These are mounted on the plate 11 in the usual manner and have a cam pin 51 which engages the edge of the web of the brake shoe. In the illustrations they engage the portion 35. In addition, to engage the brake shoe face of the brake shoe assembly I employ a plurality of lugs 55, there being two of these illustrated for each brake shoe assembly. These guide and restrict any lateral motion of the brake shoes and brake lining.

The brake lining designated generally by the assembly numeral 65 has its peripheral surface 66 on the same radius as the braking surface of the drum, hence as the shoe face member 31 of the brake shoe is on the same radius the lining is thicker at the central measurement indicated at 67 than at the end measurements indicated at 68.

I do not wish to be limited to the mechanism shown for operating the brake shoes. These may be any known or conventional type suitable for a straight line action of the brake shoes, however I illustrate a hydraulic expander indicated by the pair of hydraulic cylinders 70 each having opposite pistons 71. These are mounted in the usual manner, the pistons being shown as engaging the opposite end edges 37 of the brake shoes. These shoes are retracted also in a conventional manner as indicated by the contraction springs 75 having their ends attached to the web portion of the shoes.

The manner of operation and functioning of the brake shoe is substantially as follows having reference particularly to Fig. 3. In this figure the direction of rotation of the wheel is indicated by the arrow 85 and when the shoes are first pressed apart by the hydraulic cylinders or other mechanism they travel in a straight line direction indicated by the arrow 86 for the center portion and 87 for the end portions of the brake shoe and lining. The peripheral surface of the lining makes a complete contact with the inside of the drum immediately developing frictional action which tends to rotate or move the lining in the direction of rotation of the wheel, that is, in the direction of the arrow 85. The collar 21 on the stud 14 engages the edge 43 of the plates 40 and direct the movement of the shoe in the line of tangential contact, this being indicated by the dotted line 88 of Fig. 3. The friction on the drum together with the action against the wedging surface 43 causes the brake shoe and lining to be wedged between the stud through the medium of the collar 21 and the contact surface of the brake drum. This produces a so-called self energizing action in that the frictional contact causes the lining to develop a much increased pressure due to the slight angular or rotational movement of the brake shoe and lining as a whole in reference to its original position on the initial contact with the drum.

It will be obvious that the brake shoes on opposite sides of the wheel have similar action, each shoe is entirely independent of the other except for the applying force through the medium of the hydraulic cylinders or other suitable means. Therefore while the shoes shown in Fig. 3 may be considered as having a slight upward wedging action, the brake shoe on the opposite side has a slight downward wedging action, however the braking pressure is the same on both sides of the center of the wheel. It will be manifest that the same braking action comes into play when the wheel is rotating in an opposite direction and therefore presuming the direction of rotation of 85 to be a forward movement of the vehicle the same type of braking action comes into play on a rearward or backing movement. Nevertheless the braking action on backing is sufficient to hold a vehicle from rolling backward downhill when the brakes are applied.

In order to provide for accurate adjustment of the brake shoes the cam adjuster 50 has its cam pin 51 contact the edge 35, which edge has a concave curve concentric with the brake drum, hence both edges 35 are made from the same center. Therefore when the brake shoes are retracted they are each properly centered as to a diametrical line of the wheel and there is no binding action when the shoes are pressed outwardly in applying the brakes. In the illustration it will be noted that the edges 43 of the wear plates 40 which engage the rotatable wear collar 21 are each at an angle of 30 degrees to a diametrical line through the center of the brake assembly and the studs 14, therefore these two complementary surfaces as illustrated form an angle of 60 degrees. However the angle presented is a matter of engineering design depending on the particular type of weight of vehicle in which the brakes are used, the force applied to thrust the shoes outwardly and the pull back tension of the springs or the like. In some cases I have found that the wear edges 43 give a better action when forming an angle of 45 degrees, that is, 90 degrees between the two edges but these angles may be varied through a wide range. When the shoes are pressed outwardly the lining is brought in contact with the drum substantially from end to end and immediately the rotation of the drum causes a shift of the brake shoe whereby one of the tangential edges engages the collar 21, which collar being free to rotate reduces the friction due to the wedging action.

The crescent shaped line which is thicker at the center than at the end portions during its complete wear still has the cylindrical contact with the brake drum and as the brake shoe is on the same radius as the drum even when worn to a considerable degree, there is still a greater thickness at the center than at the ends. Another advantage of having the crescent shaped lining relates to the absorption and transmission of heat. A brake lining is a much better heat insulator or heat resistant than the metal brake shoe. Therefore the thick center resists the transference of heat due to friction from the brake drum to the metal brake shoe. Therefore as the brake shoe is retained in a cooler condition than in cases where the lining is of constant thickness, there is less distortion or expanding of the brake shoe due to heat as above mentioned, transmitted through the lining from the drum to the shoe, hence as the shoe maintains its true circular shape to a greater extent than common practice, the lining also maintains its proper and desired curvature.

The advantage of mounting the brake shoes to have a slight wobbling action and forming the collar 21 with a barrel type peripheral surface and also having the contact edges of the wear plates shaped to conform to the surface of the collar resides in the fact that it is almost impossible to prevent the brake drum portion 27 from expanding or becoming so-called bell shaped due to heat produced through friction. It is a desirable characteristic that the inside surface of the brake drum be always cylindrical but when the drum expands it becomes slightly conical. With my mounting of the brake shoes each shoe can have a slight wobbling action as illustrated in Fig. 4 in an exaggerated manner so that the lining will form a proper and close contact with the conical shaped brake drum caused by its expansion under heat. This gives an even wear to the lining between its opposite side edges. In the usual type of brake shoe mounting where no provision is made for this wobbling action the lining frequently wears more at one edge of a shoe than at the other.

In the illustrations the studs 14 and the notches in the wear plates are illustrated so that these notches are equi-distant between opposite ends of the brake shoes. In this construction the shoes are therefore symmetrical. Each shoe can be turned end for end and as the two shoes are alike, they can be exchanged, that is, the shoe on the forward side of the wheel and the rearward side may be interchanged. Also in manufacturing only one design is necessary. However in some cases it may be desirable to have the notches closer to one end of the brake shoe than the opposite end but still employing the feature of the wedging action of the edge of wear plates at the notches contacting the roller 21 or the stud 14 directly where this is feasible. By constructing the shoes in this manner with the notch non-symmetrical, the shoes may be made to develop quite an appreciable self-energizing action in slow movements of the vehicle. This is a matter of some importance particularly in regard to heavy trucks and in cases in which it is desired to develop a high brake force on the slow backing of a vehicle or to hold a vehicle from backing. Such construction is of particular advantage in dump trucks or the like.

In Fig. 5 I show an alternative construction of the brake having a reversal of the wedging elements from that of the construction of Fig. 1. In Figs. 5 and 6 the stationary back plate 101 may be the same as shown in Fig. 1. This may be considered as having a pair of wedge plates 102 and 103 mounted on the back plate and being held in place by a series of bolts 104 which are fitted through perforations in the back plate, the plate 103 being spaced by a spacing sleeve 105 from the backing plate and the two plates being spaced one from another by another spacing sleeve 106. The plates 102 and 103 as well have a central opening 107 to accommodate the wheel axle assembly. These plates are of sufficient thickness to be each rigid as to itself. The plates have similar notches 108 at their opposite ends, each notch having a central circularly curved portion 109 and tangential edges 110. The notches are located diametrically opposite and each of the edges 109 and 110 has an outward bevel or somewhat concave shape considered axially of the wheel assembly indicated by the numeral 111, (note Fig. 6). The brake drum 115 may be of conventional type having the drum disk 116 and the cylindrical drum 117. The brake shoe assembly is somewhat as shown in Fig. 1, each brake shoe being designated by the numeral 120. Each shoe has an arcuate flange 121, this being on the same radius as the inside of the brake drum. A substantial web 122 is located midway between the side edges of the flange. It will be noted that the web is quite deep. It has a curved center edge 123, straight edges 124 extending therefrom, a concentric concave curved wedging edge 125 and convex end 126. Each brake shoe assembly is held in place by a cam adjuster 130 each secured to the disk or backing plate 101 and engaging the curved edge 125. This edge has a curvature concentric with the brake drum. A plurality of lugs 131 is also secured to the back plate 101 and engage an edge of the flange of the shoes and also permit a tilting of the shoe assembly, should the brake cylinder 117 become belled due to heat expansion. The brake lining 135 is secured to the flange. The outside surface is on the same radius as the cylinder of the drum and the surface of the flange 121. Therefore the lining is thicker at the center portion indicated 136 than at the two end portions indicated 137. The brake shoes may be operated in any conventional manner, a hydraulic cylinder equipment being indicated at 140 employing cylinders 141 and pistons 142, the pistons contacting the ends 126 of the brake shoe webs and the shoes are retracted by retraction springs 145.

In this construction the rolling or wedging action in the self energizing function of the brakes is developed by employing the wedging assembly 150 which employs studs or rivets 151 secured to the web of each brake shoe at substantially its center and on the stud are mounted two washer-like rollers 152 and 153, these being thus located on opposite sides of the web and are confined by the heads 154 on the ends of the studs 151. Each of the rollers has a convex face 155 considered in an axial direction and complementary to the concave edge 111 of the notches 108 at the plates 102. This is to permit tilting action of the brake shoe assemblies when the brake drum becomes bell-shaped through heat.

In this type of construction the web of the brake shoes is intact without any notch and the element transmitting the wedging pressure, that is, the stud 151 is located quite close to the flange of the shoe and the proximity to the flange 121 is only limited by the diameter of the disk rollers 152 and 153. In the action in applying these brakes the first motion of the brake shoes is diametrically outwardly in opposite directions until the lining contacts the drum. Then, depending on the direction of the rotation of the drum, the friction develops a motion of the brake shoe in the same direction as the rotation of the drum. This produces a rolling action of the disk rollers 152 and 153 on the curved part 109 and the tangential portion 110 of the fixed plates 102 and hence there is a wedging action and pressure increasing the friction between the lining and the drum due to this self energizing function. It is manifest that the angles formed by the edges 110 may be varied depending on the brake assembly and the type of work to be accomplished by the brake and also depending to some extent on the diameter of the rollers 152 and 153. When the brake cylinder 117 expands by heat to a bell formation the brake shoe may tilt, the convex or barrel shaped periphery of the rollers riding on the convex faces 111 of the fixed plates 102. This causes the lining to be accommodated to this bell action or shape of the brake drum cylinder.

In the construction of Figs. 7 and 8 I show another modification using large rollers on the anchor stud. In this case the stationary or back plate is designated by the numeral 170 and supports a pair of fixed plates 171 and 172. These are properly centered by two adjusting anchor studs 173. Each stud has a cylindrical portion 174 connected to the back plate 170. This uses a lock nut 175 and a special wrench head 176. A confining washer 177 engages the inner plate 171, this being held in place by a cotter pin or similar device 178. The center portion of the stud has an eccentric 179 and such eccentric is barrel shaped on its periphery 180, that is, such periphery has a convex curve considered in an axial direction. Spacing bolts 181 also attach the plates 171 and 172 to the backing plate 170. Rotatably mounted on the eccentric or barrel portion of the anchor there are two disk-like rollers 182 and 183, these both being similar and having a central opening 184 with concave curves considered in an axial direction to bear on the barrel shaped periphery of the eccentric 179, this being for the purpose of allowing the rocking of the brake shoes as hereunder detailed.

There are two similar brake shoe assemblies 190 each of which has a flange 191 and a web 192. The flange has the same radius as that of the drum cylinder and in this case the inner edge 193 of the web may be concentric with the flange. The braking lining 194 is formed on the same radius as the drum and the brake shoe flange and thus is thicker at the center portion 195 than at the opposite ends 196. This type of shoe is centered and adjusted by eccentric adjusting studs 200 fitting through the back plate 170 and in this case the eccentric portion of these studs engages one side of the flange 191 and on the inside thereof. There are also a plurality of lugs or blocks 203 secured to the back plate and contacting the edge of the brake shoe flange permitting the rocking of the shoe when the brake shoe cylinder expands under heat to a bell formation. In these drawings the brake drum is designated by the numeral 205 having the drum disk 206 and the drum cylinder 207.

The wedging assembly 210 includes a pair of similar thrust tracks 211, these being in the form of metal bands secured on opposite sides of the web 192 of the brake shoe. These are bent to form a notch construction 212 having a center portion 213 of the same curvature as the periphery of the disk rollers 182 and 183 and having tangential track edges 214. These straps may be secured to the web of the brake shoe by rivets 215 or the equivalent.

It is to be noted that in this construction the thrust and wedging assemblies have the straps positioned with the notch construction located to one side of the center portion of the brake shoe considered from end to end. On account of the disk rollers 182 and 183 straddling the web 192 of the brake shoes, such web is not weakened by having a cut-out portion but brings the contact between the disk rollers and the track assembly 210 quite close to the flange of the brakes. In this arrangement it is immaterial how the brake shoes are expanded or contracted, however the illustration shows two similar hydraulic cylinders 220 mounted in a fixed position in reference to the back plate 170 and each having a piston 221 engaging the web of the brake shoe adjacent one end. The retraction of the shoes is accomplished by springs 222 having their ends 223 attached to the adjacent ends of the two brake shoes. In this construction it will be obvious that the converging angle formed by the tangents 214 may be varied and is dependent on the diameter of the disk-like rollers 182 and 183. This construction may be varied depending on the particular type of brake and the amount of braking effort to be applied.

This construction gives a self-energizing action much the same as in the other forms of my brake. Presuming the brake drum is rotating, the first action on thrusting the brake shoes outwardly is to give an outward movement to the end portion 225 immediately engaged by the moving pistons 221. The connecting springs 222 between the contiguous ends of the two brake shoes is not sufficient to move the opposite end 226 outwardly, however, this end contact of the lining with the drum is sufficient to develop a friction producing a movement of the brake shoe as a whole in reference to the thrust rollers 182 and 183 which are fixed in position. This produces a rolling and wedging action of the rollers and the tracks 210 and hence develops the self-energizing action or function of the brake.

One of the important characteristics of my invention, especially when using the type of Fig. 5, is that the notches 108 can be made with the tangential edges 110 of a different slope as to the upper and lower sides of the notch. Thus for instance at the left hand end of Fig. 5, the lower edge is of a lesser angle in reference to the horizontal plane than the upper edge whereas at the right hand end these are reversed. Presuming the wheel to be rotating in a clockwise direction as to Fig. 5, when the vehicle is moving in a forward direction with the wedge plate 102 positioned as shown, a greater braking power is developed in this clockwise rotation of the wheel, hence by this construction choosing the suitable angles obtained by calculation and experiment, one set of wedge plates such as 102 with identical notches may be used for all four brakes of a four-wheel vehicle. In passenger motor cars it is usually desirable to have a much greater braking action on the front wheels than the rear wheels which may be obtained by using the plates 102 on the front wheels to give the greater action in stopping when the vehicle is travelling forward and a lesser action on the rear wheels. Thus there will be a reverse operation when the vehicle is backing of a stronger application of the brakes on the rear wheels than on the front wheels. By this construction all of the four brake shoes and linings, etc., for all four wheels may be the same, hence materially reducing the cost of manufacture and equipment of motor cars equipped with this type of brake.

Various changes may be made in the details of the construction without departing from the spirit or scope of the invention as defined by the appended claims.

I claim:

1. In a brake having a fixed supporting structure, a rotatable brake drum, one or more braking elements each having a brake lining mounted on the fixed structure, a fixed confining element for the brake elements and means to move the brake element to contact the drum combined with a wedging means including one or more wedging surfaces on one of the elements positioned symmetrical as to a radius line, a complementary stud-like reacting means on the other element normally positioned symmetrical as regards the adjacent wedging surfaces, the reaction of the wedging surfaces and the stud-like reacting means when the linking contacts the drum and is shifted by friction therewith to develop a relative movement of the said surface or surfaces and the stud-like reacting means, the means mounting the brake elements permitting a tilting of such elements as to the axis of the drum, the contact line of the wedging surfaces and the stud-like reacting means having a curved contact to permit the tilting of the brake element when the drum assumes a bell-like cone shape due to expansion by temperature.

2. In a brake having a fixed supporting structure, a rotating brake drum, a plurality of brake shoes each having a lining, the shoes being mounted on the fixed structure with means to move the shoes to contact the drum, the combination of a wedge plate assembly having a fixed attachment to the fixed supporting structure, the plate assemblies having a pair of divergent wedging surfaces facing towards each brake shoe, a stud mounted on each brake shoe and having a friction reducing means engaging the adjacent wedge surfaces, the diverging wedging surfaces having each a different angle relative to a line through the apex of the converging lines of a pair of wedging surfaces and the stud whereby on the outward thrust of the shoes and lining a rolling action is developed between a wedge surface and the adjacent roller and stud wedging the lining against the drum.

3. In a brake having a fixed supporting structure, a rotating brake drum, a pair of brake shoes each having a lining, the shoes being mounted diametrically opposite on the fixed structure in combination with means to move the shoes in a straight radial line to contact the drum, each shoe having a stud with a roller mounted thereon with the axis of the roller parallel to the axis of the drum, a wedge plate assembly attached to the fixed structure and having diverging wedge surfaces diametrically opposite, each surface being tangential to the surface of a roller whereby when the brake shoes contact the rotating the drum the rollers maintain a contact with one of the diverging wedge surfaces and thereby increase the braking pressure of the brake lining against the drum.

4. In a brake as claimed in claim 3, the diverging wedge surfaces each forming a different angle helative to a line drawn through the apex meeting points of the wedge surfaces and the axis of the stud thereby giving a different braking pressure of the lining against the drum for a different rotation of the drum in reference to the wedge plate assembly.

5. In a brake having a fixed supporting structure, a rotating brake drum, a brake shoe having a brake lining movably mounted on the fixed structure, means to move the shoe to contact the drum, the combination of a wedging means including two converging wedging surfaces for each shoe, a stud-like reacting means with a roller on the stud positioned to engage either of the wedging surfaces when the friction of the brake lining against the drum causes a movement of the lining in a direction of rotation of the drum, the wedging surfaces having a concave curvature considered in the axial direction of the drum and the roller having a convex curvature also in an axial direction of the drum, the brake shoes being mounted in a fixed supporting structure for a tilting movement whereby the contact of the convex surface of the roller and the concave wedging surfaces permits the brake shoe and lining to tilt when the drum assumes a bell-like cone shape due to expansion by temperature.

6. In a brake having a fixed supporting structure, a rotating drum, a pair of brake shoes each having a lining, the shoes being mounted diametrically opposite on the fixed structure, the combination of a support for the shoes on the fixed structure for diametrically opposed motions in and out and a tilting movement as regards the drum, each shoe having a stud thereon with its axis parallel to the axis of the drum, a roller on the stud having a face convex considered on any radial plane, a wedge plate assembly attached to the fixed structure and having two pair of diverging wedge surfaces diametrically opposite, each surface being adapted to contact the surface of the roller and each surface being concave on any line parallel to the axis of the stud, means to expand the shoes outwardly and means to retract such shoes, the retracting means normally retaining each roller in contact with a pair of the diverging wedge surfaces and the expanding means adapted to force the shoes with the lining in contact with the drum whereby on rotation of the drum the roller has a turning movement on one of the pair of wedge surfaces and thus develops an increased braking action of the lining against the drum, the convex curve on the roller and the concave curve on the wedge surfaces permitting a tilting of the brake shoe and lining should the drum become bell-shaped due to expansion by heat.

7. In a brake having a fixed supporting structure, a rotating brake drum, brake shoes each having a lining and supported and mounted for movement on the fixed structure with means to move said shoes to contact the drum combined with a wedge plate assembly securely attached to the fixed supporting structure and having adjacent each brake shoe wedging surfaces diverging in relation to a radius line through the apex defined by the diverging surfaces, a stud secured to each brake shoe and having a friction reducing device thereon to engage the adjacent wedge surfaces of the plate assembly, thrust means reactive on the brake shoes to produce a straight line outward motion of such shoes to engage the lining of the shoes with the rotating brake drum whereby the friction of such contact develops a movement of the shoe in the direction of rotation of the drum and a wedging movement between one of said wedging surfaces and the stud thereby incrasing the brake action.

EDMUND G. HEINZELMAN.